US009285637B2

(12) United States Patent
Lin et al.

(10) Patent No.: US 9,285,637 B2
(45) Date of Patent: Mar. 15, 2016

(54) LIQUID-CRYSTAL DISPLAY

(71) Applicant: InnoLux Corporation, Miao-Li County (TW)

(72) Inventors: Bi-Ly Lin, Miao-Li County (TW); Hsing-Chien Tuan, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 203 days.

(21) Appl. No.: 13/924,978

(22) Filed: Jun. 24, 2013

(65) Prior Publication Data

US 2014/0002778 A1 Jan. 2, 2014

(30) Foreign Application Priority Data

Jun. 29, 2012 (TW) .............................. 101123393 A

(51) Int. Cl.
*G02F 1/1339* (2006.01)
*G02F 1/1335* (2006.01)

(52) U.S. Cl.
CPC ........ *G02F 1/1339* (2013.01); *G02F 1/133512* (2013.01); *G02F 2202/16* (2013.01)

(58) Field of Classification Search
CPC ............ G02F 1/133512; G02F 1/1345; G02F 1/1339; G02F 1/136286; G02F 1/133514; G02F 1/133606; G02F 1/136209; G02F 1/133509; G02F 1/133611; G02F 2001/133388; G02F 2001/13398; G02F 2001/136218
USPC ......... 349/106, 110, 153, 139, 111, 104, 122, 349/138, 155; 445/25
See application file for complete search history.

(56) References Cited

U.S. PATENT DOCUMENTS

| 5,889,569 A * | 3/1999 | Okamoto et al. ............. 349/110 |
| 5,910,829 A * | 6/1999 | Shimada et al. ............. 349/110 |
| 6,392,735 B1 | 5/2002 | Tani |
| 2004/0075802 A1 * | 4/2004 | Kitamura et al. ............. 349/153 |
| 2005/0117093 A1 * | 6/2005 | Kim et al. ..................... 349/106 |
| 2009/0257016 A1 * | 10/2009 | Ito et al. ........................ 349/153 |
| 2009/0316089 A1 | 12/2009 | Shin et al. |
| 2011/0141427 A1 | 6/2011 | Jung et al. |

FOREIGN PATENT DOCUMENTS

| CN | 101614913 A | 12/2009 |
| EP | 1 480 071 A1 | 11/2004 |
| GB | 2 279 656 A | 1/1995 |
| TW | 550430 B | 9/2003 |
| TW | 201120526 A | 6/2011 |

OTHER PUBLICATIONS

Office Action and Search Report of corresponding Taiwanese patent application No. 101123393 issued on Sep. 11, 2014.

* cited by examiner

*Primary Examiner* — Thoi Duong
(74) *Attorney, Agent, or Firm* — Muncy, Geissler, Olds & Lowe, P.C.

(57) ABSTRACT

An embodiment of a liquid-crystal display is provided, including: a display area; and a shielding area surrounding the display area, wherein the shielding area includes: a light-shielding layer adjacent to a side of the display area; and a sealant dispensing area adjacent to a side of the light-shielding layer opposite to the display area, wherein the shielding area has a total light transmittance of less than or substantially equal to that of the shielding layer.

7 Claims, 4 Drawing Sheets

US 9,285,637 B2

LIQUID-CRYSTAL DISPLAY

CROSS REFERENCE TO RELATED APPLICATIONS

This Application claims priority of Taiwan Patent Application No.101123393, filed on Jun. 29, 2012, the entirety of which is incorporated by reference herein.

BACKGROUND

1. Field of the Invention

The present disclosure relates to a display device. More particularly, the present disclosure relates to a liquid-crystal display which may have a narrow border.

2. Description of the Related Art

Liquid-crystal display (LCD) technology has been fully developed to replace the conventional cathode ray tube (CRT) imaging technology, and is widely used in various electronic products. Typically, an LCD may have a substrate and an opposite substrate with a liquid-crystal layer is interposed therebetween. The liquid-crystal layer may be sealed by a sealant. The sealant may be an adhesive material to adherently secure the substrate with the opposite substrate. The adhesive material is usually optical glue which is able to be cured by irradiation.

The LCD usually comprises a display area for imaging and a shielding area functioning as a border. The border is covered by a frame in the final product of the LCD. The shielding area may include a light-shielding layer for shielding metal traces and preventing light leakage from the display area and provide an area for coating the sealant. In typical, the light-shielding layer and the metal traces are formed on different substrates. With continuous in LCD and semiconductor technology, the width of metal traces and pitches therebetween are continuously shrinking. Light irradiation is therefore difficult to penetrate the metal traces to cure the sealant. Therefore, the sealant can only be cured by light irradiation from another substrate, but the light-shielding layer on the another substrate may also hinder the curing of the sealant, New LCD trends include having a narrow frame for aesthetics while increasing the display area under the same size of the LCD. To achieve the design requirements of the narrow frame, a narrow border is needed. However, the narrow border means that the available width of the shielding area is reduced. As such, the sealant cannot be completely cured by receiving enough light irradiation if the width of the light-shielding layer is not reduced with the shielding area. Alternatively, the light-shielding layer cannot effectively reflect the light leakage from the display area back if the width of the light-shielding layer is also reduced with the shielding area.

Thus, it is a challenge to completely cure the sealant while effectively preventing light leakage and sufficiently masking the plurality of metal traces with a narrow border design. In other words, it needs a novel LCD with a narrow border design, in which the sealant is completely cured, and the light leakage and insufficient masking problems are solved.

BRIEF SUMMARY

By reducing the total light transmittance of the sealant dispensing area, a novel LCD with a narrow border design is provided, in which the sealant is completely cured, and the light leakage and insufficient masking problems are solved.

The present disclosure provides a liquid-crystal display, including: a display area; a shielding area surrounding the display area, wherein the shielding area includes: a light-shielding layer adjacent to a side of the display area; and a sealant dispensing area adjacent to a side of the light-shielding layer opposite to the display area, wherein the shielding area has a total light transmittance of less than or substantially equal to 50% and greater than 0.

The present disclosure also provides a liquid-crystal display, including a display area and a shielding area surrounding the display area, wherein the shielding area has a total transmittance of equal to or less than about 50% and greater than 0, the liquid-crystal display including: a first substrate including a pixel electrode and a plurality of metal traces disposed thereon, wherein the pixel electrode is disposed in the display area, and the plurality of metal trances are disposed in the shielding area and connected to the pixel electrode; a second substrate including a light-shielding layer and an opposite electrode disposed thereon, wherein the light-shielding layer is disposed in the shielding area and adjacent to a side of the display area; a sealant, adhering the first substrate and the second substrate, disposed in a sealant dispensing area and surrounding a side of light-shielding layer opposite to the display area, wherein the sealant dispensing area is in the shielding area; and a liquid-crystal layer interposed between the first substrate and the second substrate and surrounded and sealed by the sealant.

BRIEF DESCRIPTION OF THE DRAWINGS

The disclosure will now be described, by way of example, with reference to the accompanying drawings, in which.

DETAILED DESCRIPTION

The following description is of the best-contemplated mode of carrying out the invention. This description is made for the purpose of illustrating the general principles of the invention and should not be taken in a limiting sense. For example, the formation of a first feature over, above, below, or on a second feature in the description that follows may include embodiments in which the first and second features are formed in direct contact, and may also include embodiments in which additional features may be formed between the first and second features, such that the first and second features may not be in direct contact. The scope of the invention is best determined by reference to the appended claims.

Figure 1:
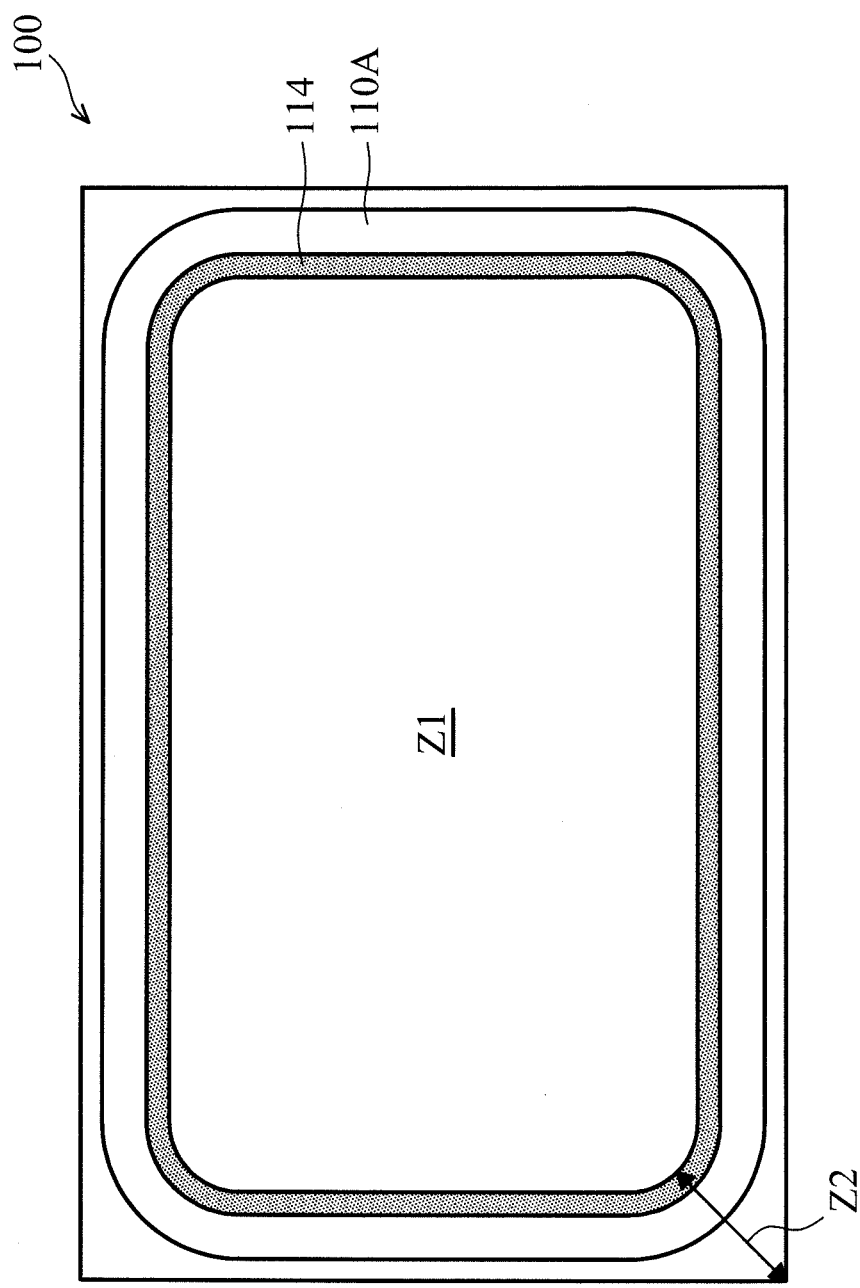
FIG. 1 shows is a top view of an LCD according to an embodiment of the present disclosure.

Referring to FIG. 1, illustrated is a top view of an LCD 100 according to an embodiment of the present disclosure. As shown in FIG. 1, the LCD 100 may have a display area Z1 and a shielding area Z2 surrounding the display area Z1. The shielding area Z2 may comprise a light-shielding layer 114 and a sealant dispensing area 110A. The shielding area Z2 may have a total light transmittance of less than about 50% and greater than 0. The light-shielding layer 114 may be adjacent to and surround the display area Z1. In various embodiments of the present disclosure, the light-shielding layer 114 may be defined as a layer formed of a light-shielding material which may block light such that the light penetration cannot be observed by the user's naked eyes. For example, the light-shielding layer 114 may have an optical density of greater than about 3.5. The sealant dispensing area 110A may surround a side of the light-shielding layer 114 opposite to the display area Z1. Sealant may be applied to the sealant dispensing area 110A. The sealant and a substrate may have a contacting width substantially equal to the width of the sealant area 110A. In an embodiment, the sealant area 110A may further comprise other materials able to reduce the light transmittance, such as color filters of various colors, photoresists having mechanical support functions, non-transparent metal layers, or etc.

The sealant dispensing area 110A may have a total light transmittance of less than or substantially equal to the light transmittance of the light-shielding layer 114. For example, in an embodiment, various materials (including the sealant) in the sealant dispensing area 110A may have a total light transmittance of less than or equal to about 50% and greater than 0, or may have a total light absorption of about 50% to 100% of that of the light-shielding layer 114. In addition, the light-shielding layer 114 and the sealant dispensing area 110A may have a total width of less than about 5 mm, for meeting the current requirements of the narrow border. Note that the total width of the light-shielding layer and the sealant dispensing area described above is merely an embodiment for illustration, one skilled in the art would make suitable changes according to the techniques at the time.

Accordingly, by reducing the total light transmittance of the various materials in the sealant dispensing area, the light leakage and insufficient masking problems resulting from the narrowed width of the light-shielding layer would be solved. In addition, the sealant itself may have a sufficiently large area to receive the light irradiation and provide enough adhesion. The reliability of the sealant as well as the reliability of the LCD can be improved.

Figure 2:
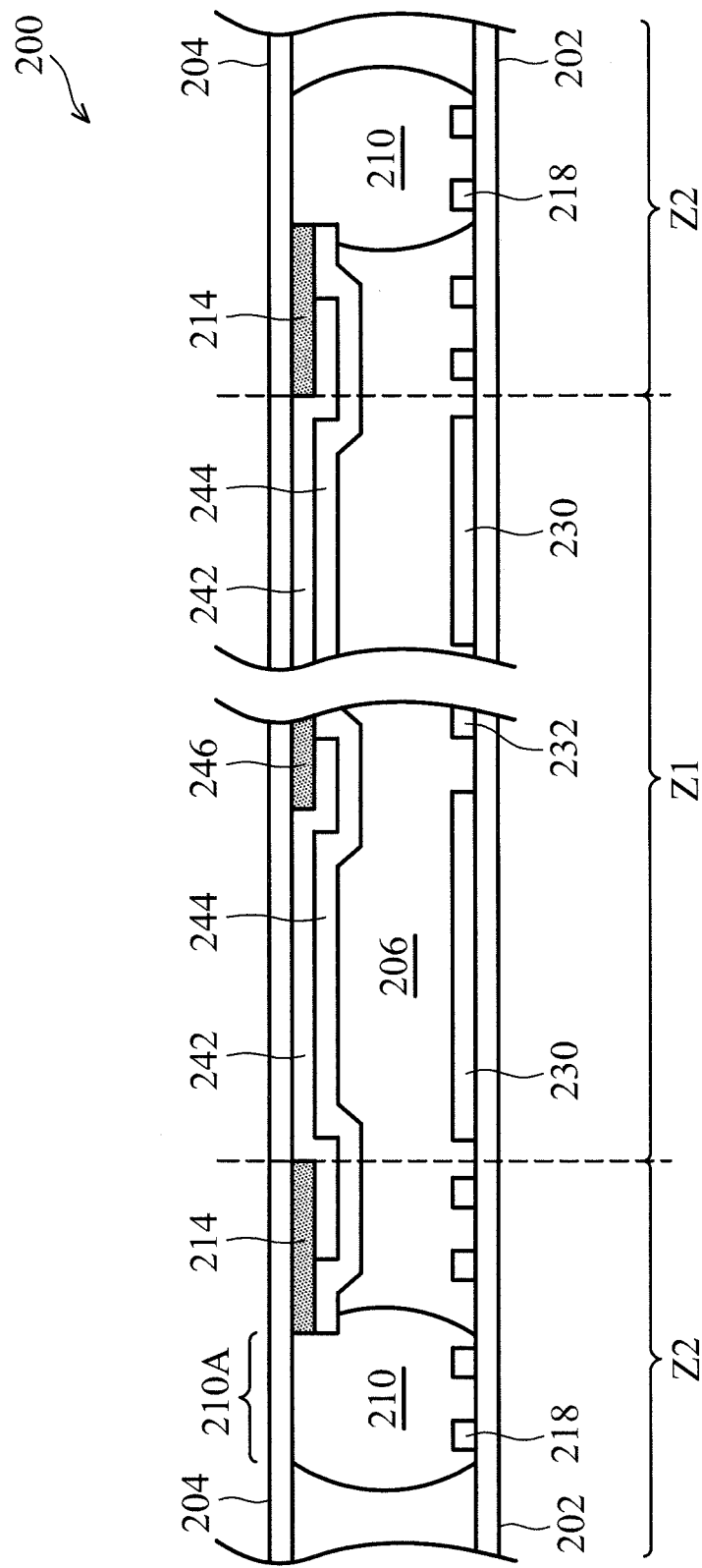
FIGS. 2~4 show cross-sectional views of LCDs according to embodiments of the disclosure.

Referring to FIG. 2, illustrated is a cross-sectional view of an LCD 200 according to an embodiment of the present disclosure. Reference may be made to FIG. 1 for top view of the LCD 200. For example, the LCD 200 may have a display area Z1 and a shielding area Z2 surrounding the display area Z1.

The LCD 200 may comprise a first substrate 202, a second substrate 204 and a layer 206. The second substrate 204 and the first substrate 202 may be oppositely disposed and are adherently secured by sealant 210. The liquid-crystal layer 206 may be interposed between the first substrate 202 and the second substrate 204. The sealant 210 may surround the perimeter of liquid-crystal layer 206 for sealing the liquid-crystal layer 206. In an embodiment, the first substrate may be a thin-film transistor (TFT) array substrate, comprising an electrode 230, at least one TFT 232 and a plurality of metal traces 218 disposed on a glass substrate. The electrode 230 and the least one TFT 232 each may have at least a portion located inside the display area Z1. The electrode 230 may be a pixel electrode. The pixel electrode may be a transparent electrode layer including indium tin oxide (ITO), indium zinc oxide (IZO) or aluminum zinc oxide (AZO). The plurality of metal traces 218 may be disposed in the shielding area Z2. The plurality of metal traces 218 may electrically connect the various components, such as the electrode 230, in the display area Z1 to outer circuits such as the input/output. The plurality of metal traces 218 may be formed of metal or any other conductive materials.

The second substrate 204 may comprise a color filter 206 and an opposite electrode 244 disposed on a glass substrate. The color filter 242 may be disposed in the display area Z1 and correspond to the pixel electrode 230 on the first substrate 202. In some embodiments, a black matrix 246 may be disposed between the color filters 242 of different colors. The opposite electrode 244 may conformally cover the color filter 242. In an embodiment, the light-shielding layer 214 may be disposed on the second substrate 204 and in the shielding area Z2 with adjacent to and surrounding the display area Z1. In some embodiments, the light-shielding layer 214 may have a width of less than about 5 mm and have a thickness of less than about 3 μm. The light-shielding layer 214 may comprise a material having an optical density of greater than about 3.5. For example, the light-shielding layer 214 be formed of one or more layers of black ink, colored photoresist, black photoresist, polarizer or a combination thereof.

The sealant dispensing area 210A may be located at the outer side of the light-shielding layer 214 for receiving the light irradiation. Sealant 210 may be applied to the sealant dispensing area 210A with surrounding the light-shielding layer 214 and the liquid-crystal layer 206. In an embodiment, the sealant may be optical glue having a light transmittance of less than or substantially equal to 50% and greater than 0. Alternatively, the sealant may be optical glue having a light sbsorption of about 50% to 100% of the light absorption of the light-shielding layer 214. In an embodiment, the sealant 210 may comprise colored epoxy resin, acrylate resins, poly(urethane acrylates), phenolic resin, carbon powders. The sealant 210 may itself have a low light transmittance. Alternatively, the sealant 210 may have the low transmittance by doped with other substances, such as non-transparent metal particles, non-transparent ceramic particles or non-transparent plastic particles. In an embodiment, the sealant 210 may cover at least a portion of the metal traces 218 and in direct contact with the metal trances 218. In order to prevent from forming an electrical connection between the plurality of metal traces 218 on the first substrate 202 and the opposite electrode 242, the sealant 210 may be formed of insulating materials. Alternatively, the sealant 210 may also comprise conductive materials, such as metal particles, doped therein with a content of less than 3 wt % of the sealant 210. The sealant 210 may act as the light-shielding layer for masking the plurality of metal traces 218 due to its low light transmittance, such that the user would be difficult to observe the plurality of metal traces 218 and the light leakage from the display area Z1 can also be reflected back. In some embodiments, since each of the materials in the shielding area Z2 may have a light transmittance of less than or substantially equal to 50% and greater than 0, the shielding area may have a total light transmittance of less than or substantially equal to 50% and greater than 0.

In an embodiment, the sealant 210 and the substrate may have a contacting width of substantially equal to the width of the sealant dispensing area 210A, for example, between about 0.3 mm to 5 mm. In addition, the sealant 210 and the light-shielding layer 214 may have a total width of between about 0.3 mm to 5 mm. It can be understood that the widths described above are merely embodiments for illustration, one skilled in the art would make suitable changes according to the techniques at the time.

Figure 3:
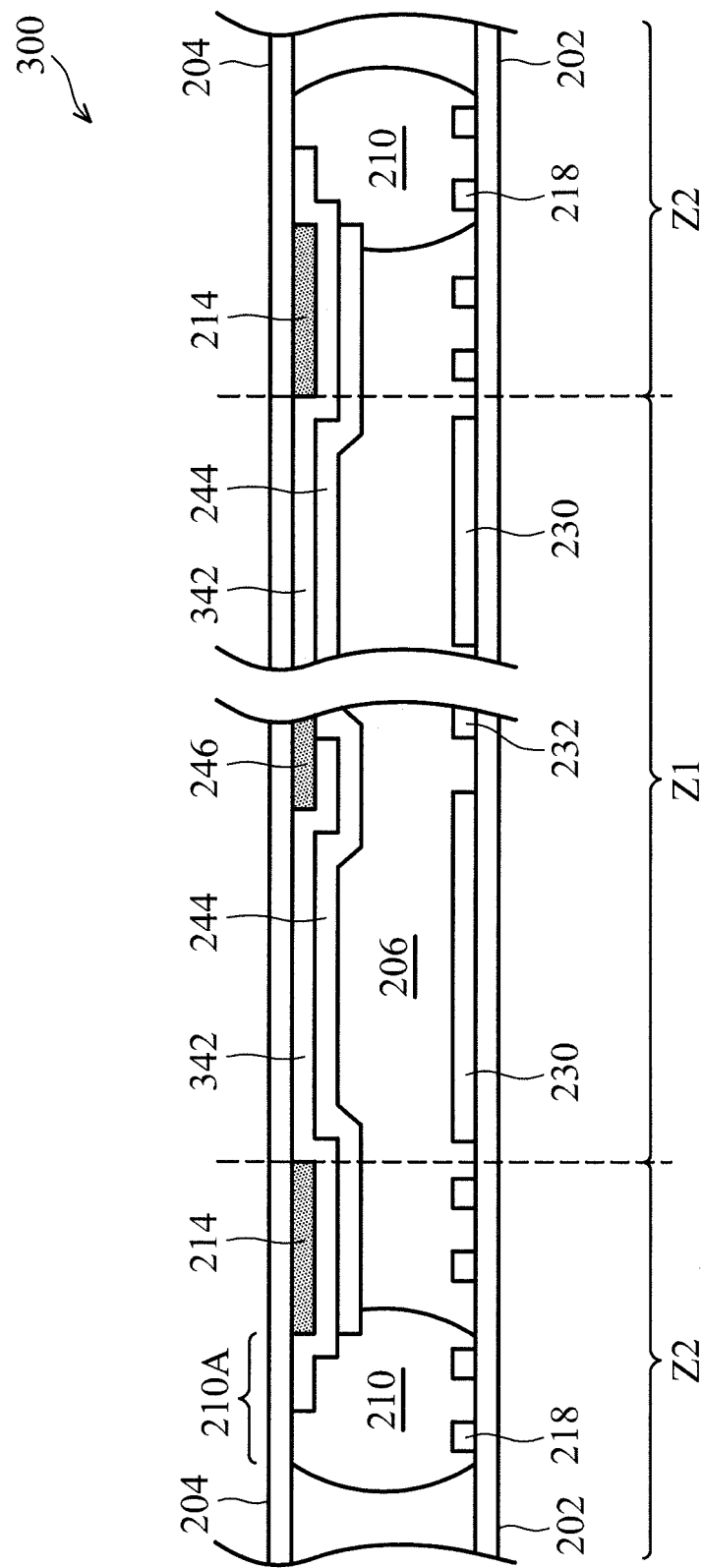

Referring to FIG. 3, illustrated is a cross-sectional view of an LCD 300. Reference may be made to FIG. 1 for top view of the LCD 300. For example, the LCD may have a display area Z1 and a shielding area Z2 surrounding the display area Z1. In addition, the LCD 300 may further comprise a color filter or other features capable of reducing light transmittance for further reducing the light transmittance of the sealant dispensing area. In this embodiment, like reference numerals are used to indicate elements substantially similar to the elements described in the previous embodiments.

The LCD 300 may comprise a first substrate 202, a second substrate 204 and a liquid-crystal layer 206. The second substrate 204 and the first substrate 202 may be oppositely disposed and adherently secured by sealant 210. The liquid-crystal layer 206 may be interposed between the first substrate 202 and the second substrate 204. The sealant 210 may surround the perimeter of liquid-crystal layer 206 for sealing it. In an embodiment, the first substrate may be a TFT array substrate, comprising an electrode 230, at least one TFT 232 and a plurality of metal traces 218 disposed on a glass substrate. The electrode 230 and the at least one TFT 232 each may have at least a portion located inside the display area Z1. The electrode 230 may be a electrode. The pixel electrode may be a transparent electrode layer including indium tin oxide (ITO), indium zinc oxide (IZO) or aluminum zinc oxide (AZO). The plurality of metal traces 218 may be disposed in the shielding area Z2. The plurality of metal traces 218 may electrically connect the various components, such as the electrode 230, in the display area Z1 to outer circuits such as the input/output. The plurality of metal traces 218 may be formed of metal or any other conductive materials.

The second substrate 204 may comprise a color filter 342 and an opposite electrode 244 disposed on a glass substrate. The color filter 342 may be disposed in the display area Z1 and correspond to the pixel electrode 230 on the first substrate 202. In addition, the color filter 342 may further extend into the sealant dispensing area 210A in the shielding area Z2. In other words, other than the sealant 210, there is a color filter 342 disposed between the sealant 210 and the second substrate 342 in the sealant dispensing area 210A. In an embodiment, the color filter 342 in the sealant dispensing area 210A may have a width less than or substantially equal to the width of the sealant dispensing area 210A. For example, as shown in FIG. 3, the color filter 342 in the sealant dispensing area 210A may have a width less than the width of the sealant dispensing area 210A such that the shielding area Z2 may have gradient decreased light transmittance. For example, the light transmittance of the shielding area Z2 decreases as it is much closer to the display Z1.

It should be noted that although FIG. 3 only shows the color filter 342 extending from the display area Z1 through the light-shielding layer 214 to the sealant dispensing area 210A, in some embodiments, the color filters 342 may be individually disposed in the display area Z1 and in the sealant dispensing area 210A and not through the light-shielding layer 214. For example, since the color filter 342 in the sealant dispensing area 210A does not need to to the pixel electrode 230, it may have any colors and can be formed of one or more layers of color filters of the same or different colors. In addition, other materials capable of reducing the light transmittance, such as a polarizer, can also be disposed in the sealant dispensing area 210A. In this embodiment, the sealant 210 and the color filter 342 may have a total light transmittance of less than or substantially equal to 50% and greater than 0, or have a total light absorption of about 50% to 100% of the light absorption of the light-shielding layer 214. Furthermore, since each of the materials in the shielding area Z2 may have a light transmittance of less than or substantially equal to 50% and greater than 0, the shielding area Z2 may have a total light transmittance of less than or substantially equal to 50% and greater than 0. In this embodiment, since there are other materials which may help to reduce the light transmittance, the selection of the materials of the sealant may be more flexible. For example, the sealant may be doped with a smaller amount of particles for reducing its product cost and improving its performance.

Figure 4:
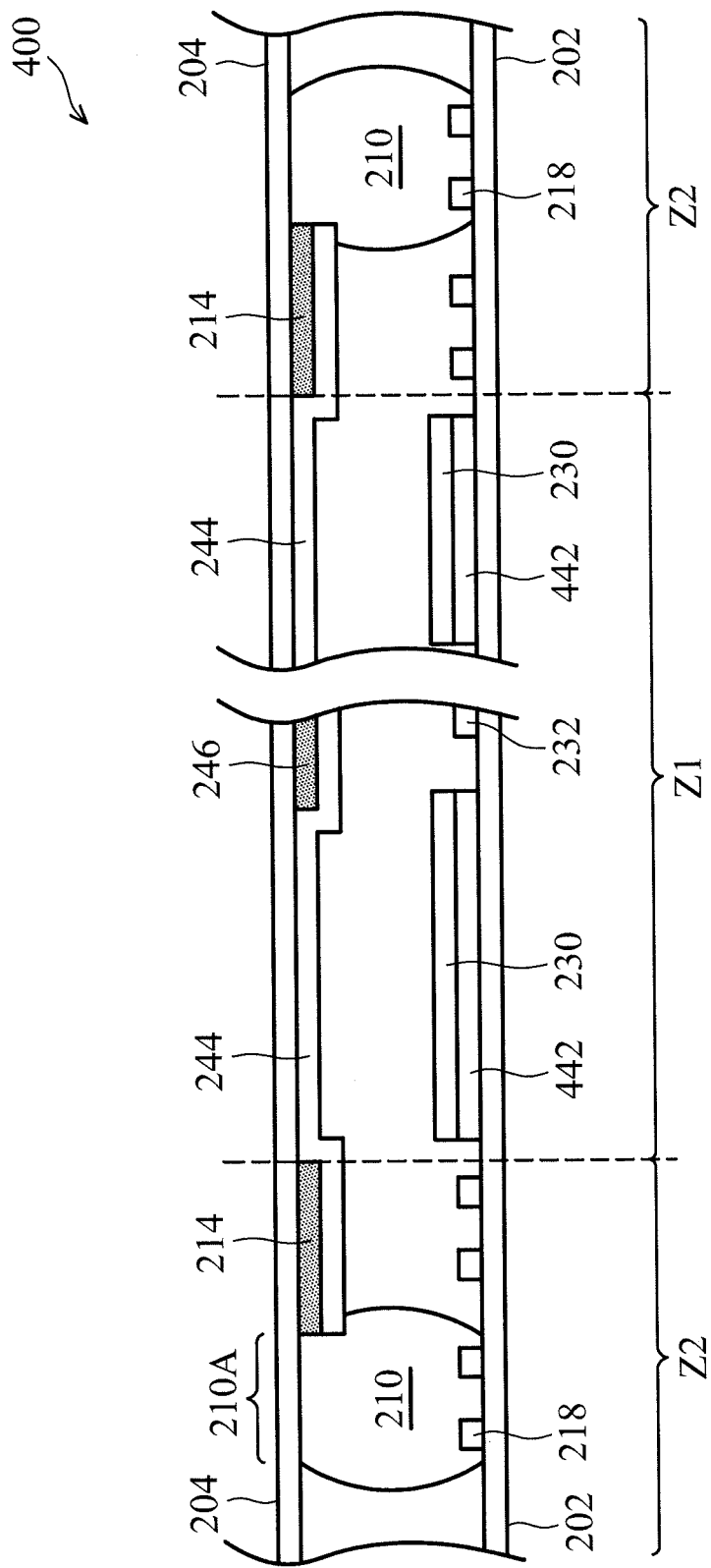

Referring to FIG. 4, illustrated is a cross-sectional view of an LCD 400 according to an embodiment of present invention. Reference may be made to FIG. 1 for a top view of the LCD 400. For example, in this embodiment, the LCD 400 may have a display area Z1 and a shielding area Z2 surrounding the display area Z1. In this embodiment, illustrated is a color filter on array (COA) type LCD, however, it can be understood that the scope of the present disclosure is not limited thereto. For example, the LCD 400 can also be applied to other types of LCDs, such as a black matrix on array (BOA) type LCD, a multi-domain vertical alignment (MVA) type LCD, a photo alignment type LCD, and a nano-protrusion multi-domain vertical alignment (NPMVA) type LCD. In this embodiment, like reference numerals are used to indicate elements substantially similar to the elements described in the previous embodiments.

The LCD 400 may comprise a first substrate 202, a second substrate 204 and a liquid-crystal layer 206. The second substrate 204 and the first substrate 202 may be oppositely disposed and adherently secured by sealant 210. The sealant 210 may surround the perimeter of the liquid-crystal layer 206 for sealing it. In an embodiment, the first substrate 202 may be a TFT array substrate, comprising an electrode 230, at least one TFT 232, a color filter 442 and a plurality of metal traces 218 disposed on a glass substrate. The electrode 230, the at least one TFT 232 and the color filter 442 may be at least disposed in the display area Z1. The electrode 230 may be a pixel electrode. The pixel electrode may be a transparent electrode layer, comprising indium tin oxide (ITO), indium zinc oxide (IZO) or aluminum zinc oxide (AZO). The plurality of metal traces 218 may be disposed in the shielding area Z2. In addition, at least a portion of the metal traces 218 may be located in the sealant dispensing area 210A. The color filter 442 may be disposed between the electrode 230 and the glass substrate and correspond to the electrode 230.

Sealant 210 may be applied to the sealant dispensing area 210A. Alternatively, other materials capable of reducing the light transmittance, such as a color filter (not shown) can also be disposed in the sealant dispensing area 210A. The sealant dispensing area 210A may have a total light transmittance of less than or substantially equal to about 50% and greater than 0, or have a total light absorption of about 50% to 100% of the light absorption of the light-shielding layer 214 for providing similar functions with the light-shielding layer 214.

Although the electrode 230 and the opposite electrode 244 which are formed on different substrates are illustrated in the preceding embodiments, but the arrangements of electrodes according to embodiments of the present disclosure are not limited to these. For example, the electrode 230 and another electrode may be formed on the same substrate for an in plane switch (IPS) type LCD.

Accordingly, by reducing the total light transmittance of the various materials in the sealant dispensing area, the light leakage and insufficient masking problems resulting from a narrow width of the light-shielding layer would be solved. In addition, the sealant itself may have a sufficiently large area to receive light irradiation and provide enough adhesion. The reliability of the sealant as well as the reliability of the LCD can be improved.

While the preferred embodiments of the invention have been described above, it will be recognized and understood that various modifications can be made to the invention and the appended claims are intended to cover all such modifications which may fall within the spirit and scope of the invention.

What is claimed is:

1. A liquid-crystal display, including a display area and a shielding area surrounding the display area, wherein the shielding area has a total transmittance of equal to or less than about 50% and greater than 0, the liquid-crystal display comprising:

a first substrate including a pixel electrode and a plurality of metal traces disposed thereon, wherein the pixel electrode is disposed in the display area, and the plurality of metal traces are disposed in the shielding area and connected to the pixel electrode;

a second substrate including a light-shielding layer and an opposite electrode disposed thereon, wherein the light-shielding layer is disposed in the shielding area and adjacent to a side of the display area;

a sealant, adherently securing the first substrate and the second substrate, disposed in a sealant dispensing area and surrounding a side of light-shielding layer opposite to the display area, wherein the sealant has a total light transmittance of less than or substantially equal to 50% and greater than 0, wherein the sealant dispensing area is in the shielding area;

a liquid-crystal layer interposed between the first substrate and the second substrate and surrounded and sealed by the sealant; and a color filter adjacent to the opposite electrode, wherein the light shielding layer comprises a black photoresist, and an overlap area of the sealant dispensing area and the light-shielding layer occupies less than 50% of the sealant dispensing area.

2. The liquid-crystal display according to claim 1 wherein the color filter is disposed in the sealant dispensing area.

3. The liquid-crystal display according to claim 2, wherein the shielding area has gradient decreased light transmittance.

4. The liquid-crystal display according to claim 1, wherein the plurality of metal traces are covered by the light-shielding layer and the sealant.

5. The liquid-crystal display according to claim 4, wherein the plurality of metal traces and the sealant are direct contact with each other.

6. The liquid-crystal display according to claim 1, wherein the sealant comprises epoxy resins of various colors, polyacrylate resins, poly(urethane acrylates), carbon powders, or a combination thereof, which are doped with metal particles, ceramic particles, plastic particles or a combination thereof.

7. The liquid-crystal display according to claim 1, wherein the sealant has a total light absorption of about 50% to 100% of the light absorption of the light-shielding layer.

* * * * *